(12) United States Patent
Ulrich

(10) Patent No.: US 7,667,602 B2
(45) Date of Patent: Feb. 23, 2010

(54) MULTI-DIRECTIONAL RFID READER FOR CONTROLLING INVENTORY AND SHELF STOCK

(75) Inventor: Richard Ulrich, Bentonville, AR (US)

(73) Assignee: Wal-Mart Stores, Inc., Bentonville, AK (US)

( * ) Notice: Subject to any disclaimer, the term of this patent is extended or adjusted under 35 U.S.C. 154(b) by 287 days.

(21) Appl. No.: 11/624,779

(22) Filed: Jan. 19, 2007

(65) Prior Publication Data
US 2008/0174432 A1 Jul. 24, 2008

(51) Int. Cl.
*G08B 13/14* (2006.01)
(52) U.S. Cl. ............... 340/572.1; 340/572.7; 340/10.1; 235/385
(58) Field of Classification Search ............. 340/572.1, 340/572.7, 572.8, 5.6, 10.1; 235/385, 383
See application file for complete search history.

(56) References Cited

U.S. PATENT DOCUMENTS

| | | | |
|---|---|---|---|
| 4,303,910 A | 12/1981 | McCann | |
| 4,595,915 A | 6/1986 | Close | |
| 4,888,579 A | 12/1989 | ReMine et al. | |
| 5,055,659 A | 10/1991 | Hendrick et al. | |
| 5,119,104 A | 6/1992 | Heller | |
| 6,046,683 A * | 4/2000 | Pidwerbetsky et al. | 340/10.4 |
| 6,204,765 B1 | 3/2001 | Brady et al. | |
| 6,662,068 B1 | 12/2003 | Ghaffari | |
| 6,804,578 B1 | 10/2004 | Ghaffari | |
| 6,903,656 B1 * | 6/2005 | Lee | 340/572.1 |
| 7,245,220 B2 | 7/2007 | Haller et al. | |
| 2005/0040232 A1 | 2/2005 | Maloney | |
| 2005/0076816 A1 | 4/2005 | Nakano | |
| 2005/0168385 A1 | 8/2005 | Baker | |
| 2007/0008071 A1 | 1/2007 | Hansen | |
| 2007/0200701 A1 * | 8/2007 | English et al. | 340/572.1 |

FOREIGN PATENT DOCUMENTS

| | | |
|---|---|---|
| WO | 97/00503 | 1/1997 |
| WO | 00/14694 | 3/2000 |

OTHER PUBLICATIONS

Naval Supply Systems Command: "*Final Report of the Passive Radio-Frequency Identification (RFID) Project at the Fleet and Industrial Supply Center, Norfolk, Virginia, Ocean Termina*," (2006).
J. Lindsay, et al., "*Retail RFID Systems without Smart Shelves*," published http://www.jefflindsay.com/rfid1.shtml (2003).
International Search Report, International Application No. PCT/US2008/051378 filed Jan. 18, 2008.

* cited by examiner

*Primary Examiner*—Anh V La
(74) *Attorney, Agent, or Firm*—Kenyon & Kenyon LLP

(57) ABSTRACT

An apparatus and method for a multi-directional RFID reader system where multi-directional readers can be place on opposing sides of a hallway leading from a back storage area to a retail floor area. The readers can be operable to detect an RFID tag associated with a product as well as its direction of movement, for example whether the product is moving from a back store room to a retail store or the opposite movement is occurring.

20 Claims, 4 Drawing Sheets

MULTI-DIRECTIONAL RFID READER FOR CONTROLLING INVENTORY AND SHELF STOCK

BACKGROUND OF INVENTION

1. Field of Invention

This invention relates generally to inventory control systems and, more particularly, to using encoded tags, for example, (Radio Frequency Identification) RFID tags, associated with a product for inventory control.

2. Background Art

It is common for retail stores to employ a "Replenishment Associate" whose job is to restock the store shelves with product obtained from a back storage room. These "Replenishment Associates" often carry handheld wireless devices that receive messages instructing the "Replenishment Associate" to restock certain products that are low on the shelves. The restock message can be typically known as a "pick list".

Inventory control systems for monitoring total inventory on hand whether on a retail display shelf or in a storage area and for monitoring shelf restacking, often times utilize encoded tags encoded with product information associated and/or attached in some manner to the product. Currently, some inventory control systems incorporate non-directional RFID readers, which are, for example, located in a hallway between the back room and the sales floor of a retail store for the purpose of tracking inventory by scanning encoded tags. Currently some systems try to keep track of where a product is located based on the "last seen" read. This is not as accurate as needed because the typical system will not know the direction a product is moving. Thus, it becomes virtually impossible to determine how many items are on the shelf. For example, if a product is removed from the shelf and returned to a back storage room because it is defective, as the Replenishment Associate travels down a passage-way equipped with RFID reader, such as a hallway between the retail floor and the back storage area, the RFID reader will detect the movement of the product, however, the reader can not tell whether the product is being moved to the shelf or to the back storage area. Directional movement is not sensed by current RFID readers. Therefore, it would be impossible to track a product with a typical RFID tag containing general product information, because the RFID tag is not individually serialized for each individual product, therefore, the system will not be able to discern if an individual product had been previously placed on the shelf. There are also various other reasons why a product would be removed from the shelf and temporarily returned to storage, such as for example, rearranging shelving which requires that shelves be emptied. Also, misreads of the RFID tags occur often. A better system is needed for effective tracking of product movement.

The monitoring of different products, by utilizing of encoded "identification tags" secured to or otherwise associated with the various articles/products has been in use for many years. Moreover, various attempts to modify this type of tracking and inventory control have been made so as to adapt a tagging system for use in a variety of different applications. Such known applications include, but are not limited to, warehouses, retail outlets, industrial manufacturing sites, and almost any location where the variety or articles or products being monitored are manufactured, transported, stored, or sold.

The tagging of articles has been associated with the display of pricing information in association with the shelving of various products. Pricing and inventory controls are sometimes maintained through the inclusion of coded data on the tags, such as by means of bar codes or RFID tags, which are determinative of the identity or price of the various products. Such information, when coded on such a tag, can be read by various types of optical or digital scanners or RFID readers. However, often these tags are not encoded, with individual serialization information for each individual product, thus items can only be tracked by category. For example, the tags would not typically contain information to allow a tracking system to distinguish one 16 oz. container of brand "ABC" juice from another 16 oz. container of brand "ABC" juice.

In an effort to expand the versatility and efficiency of tracking and inventory control of a variety of articles, products, etc. and as a result of the problems and disadvantages of the type set forth above, associated industries have focused on various technologies. For example, resulting advancements in this field has yielded the development and utilization of radio frequency (RFID) tags and their attendant systems or readers. In general, RF tags are capable of retaining and transmitting a substantial amount of information, all of which is required for the expansive tracking and inventory control requirements associated with modern day industrial, transport and retail facilities.

More specifically, the RF tag systems are capable of receiving and storing information in a read/write application as well as being capable of sending and/or receiving data relating to product identification, status, location and overall control. Radio Frequency Identification (RFID) systems can commonly be used for identification and/or tracking of equipment, products or inventory control. One category of RFID systems are radio communication systems that communicate between a radio transceiver, called an Interrogator, and a number of inexpensive devices called Tags. In RFID systems, the Interrogator communicates to the Tags using modulated radio signals, and the Tags respond with modulated radio signals.

A message can be transmitted to the Tag, and the Interrogator can then transmit a radio signal to the Tag. The Tag can modulate the signal using for example Modulated Back Scattering (MBS) where the antenna is electrically switched, by the modulating signal, from being an absorber of RF radiation to being a reflector of RF radiation. This modulated backscatter allows communications from the Tag back to the Interrogator. Conventional systems are designed a) to identify an object passing into range of the Interrogator, and b) to store data onto the Tag and then retrieve that data from the Tag at a later time in order to manage inventory or perform another useful application. Also, various other basic RFID tag and RFID reader/detection systems are well known in the art.

Based on the above, there are still significant disadvantages and problems associated with known tagging systems especially when considering the wide variety of industrial applications or inventory control applications where such systems could be effectively implemented. Accordingly, there is a significant and long recognized need for an improved tracking and/or inventory control system. Such an improved system should be capable of real time inventory control as well as detecting the existence, location and direction of movement of an item. An improved system could be further structured to detect movement and/or removal of articles or products being monitored.

An improved system that can be adapted, without significant structural or operative modification to the facility, for usage in a variety of different areas including large scale warehousing, transport, delivery, and retail inventory, without significant manual intervention. In addition, other unique and/or customized features can be associated with the tags, dependent on the customer/user applications and requirements.

Accordingly, an improved system using RFID tags with strategically placed readers allowing such an improved system to overcome the recognized problems and disadvantages associated with RFID tagging monitoring system of the type set forth above.

BRIEF SUMMARY OF INVENTION

The invention is a multi-directional RFID reader system where multi-directional readers or a single multi-directional reader can be placed along a hallway, for example, two readers on opposing sides of a hallway leading from a back storage area to a retail floor area. If another type of encoded tag is utilized other than an RFID tag, then the appropriate reader to detect that tag type can be utilized without departing from the scope of the invention. The readers can be operable to detect an RFID tag associated with a product as well as its direction of movement, for example, whether the product is moving from a back store room area to a retail store floor area or the opposite movement is occurring.

As discussed above many products currently have a RFID tags affixed to each container or box or individual product. With one embodiment of the present invention, Multi-Directional RFID Readers can be placed in a hallway extending between a back storage room area, filled with inventory, and a retail sales floor area. When a RFID tag attached or associated with a product or container passes the Multi-Directional RFID Reader, the multi-directional reader can discern that the product is moving from the back room to the sales floor as described herein. In other words the Multi-Directional RFID Readers can sense directional movement, whereas the current RFID Readers utilized in a retail environment cannot sense directional movement. The Multi-Directional RFID Reader sends a signal to the background server that the product has left the back room and is now on the sales floor. When the product is sold, the cash register sends a signal to the background server which subtracts that unit from the total number of units on the shelf.

The invention fulfills two purposes as follows: 1) When the number of units on the shelf is low or the shelf is empty, the background server knows this situation and sends a message to the "Replenishment Associate" on the wireless handheld device to restock a particular product. 2) Because the system also knows the number of units remaining in inventory in the back room, it knows when to reorder product for the store. The background server can alert a sales associate to pull inventory from the back stock room and restock the shelves. The server can discern when a shelf is empty and when to reorder inventory. The background server can be communicably linked to the RFID reader and to a handheld device utilized by the replenishment associate for receiving notifications for restocking.

If a redesign of an existing reader portal is made for multi-directional readers in the hallways between or connecting the sales floor portal and the storage room portal as discussed herein, software can be used to sense the direction that a product is traveling as it passes along the path of travel and through the portal. The existing standard RFID reader portals that are currently installed in the reader locations can be replaced with the direction sensing portals. An installer of the present invention could reuse the replaced stands in other installations where direction sensing is not important (receiving doors, shipping doors, etc). RFID readers can be placed on both sides of the hallway.

The present invention can provide a standard on how to plug in the antennas and orient the antennas for the RFID reader so that the software residing on a background server communicably linked to the readers can always know which direction a product is traveling (towards the sales floor "forwardly" or away from the sales floor "rearwardly" for instance). The reader software that is installed can have the ability to distinguish between each antenna and keep the exact time a tag down to the millisecond on each antenna so that direction of movement can be determined. The readers can also implement two or more tiers of directional RFID reader antennas for better coverage. The antenna's or individual directional sensors can have an individual identification code that it can transmit to a background server along with the detection data. The RFID reader can also provide a time stamp for each detection transmission and associated sensor identification code.

The present invention can sense the direction a product was heading, thus a greater accuracy is achieved with the inventory control logic in determining where a product is currently located. With previous systems this determination is based upon the last seen read of the product which is how many systems are designed to work in retail stores. As discussed above, relying on the last seen read can provide erroneous results.

These and other advantageous features of the present invention will be in part apparent and in part pointed out herein below.

BRIEF DESCRIPTION OF THE DRAWINGS

For a better understanding of the present invention, reference may be made to the accompanying drawings in which.

DETAILED DESCRIPTION OF INVENTION

Figure 1:
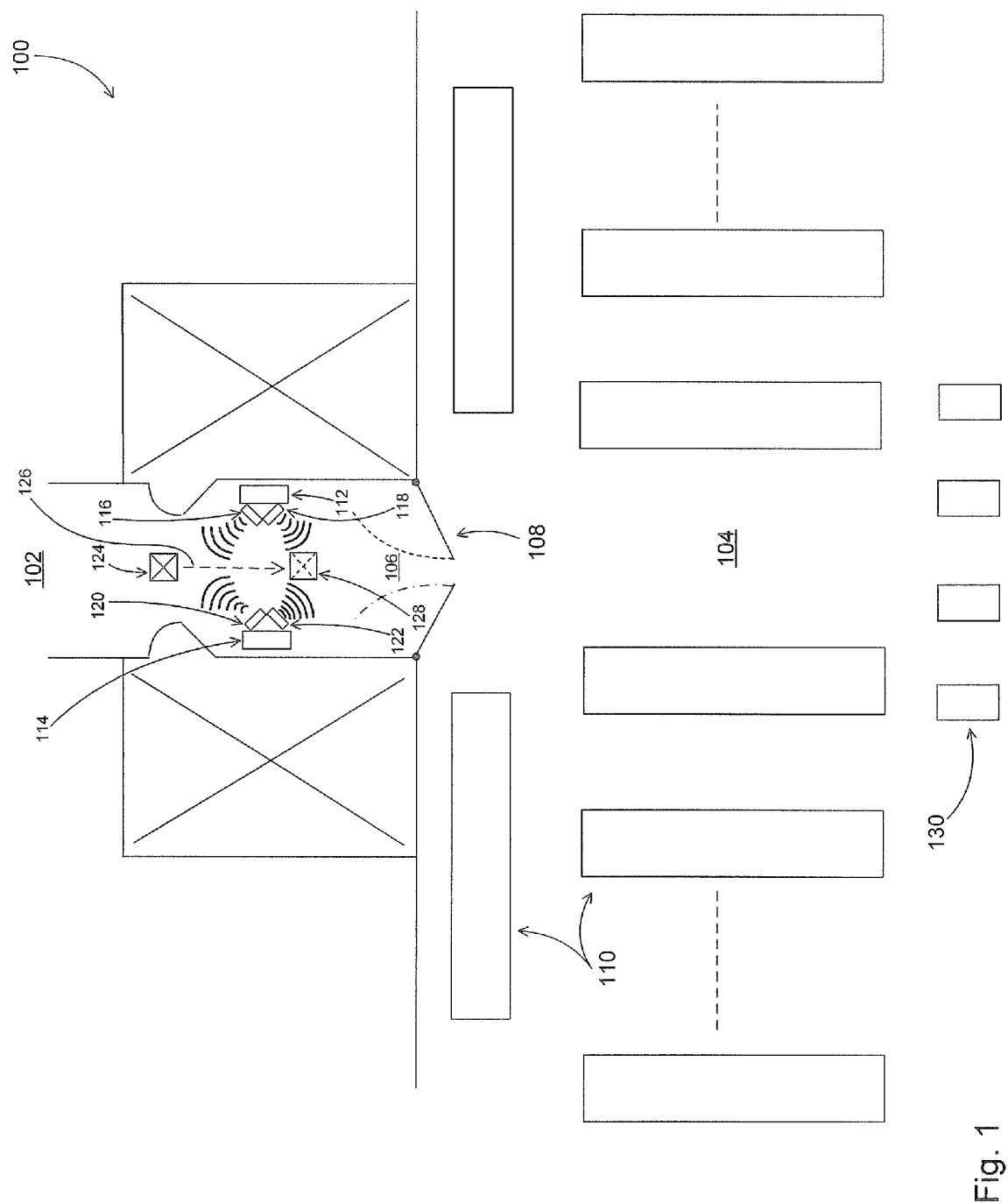
FIG. 1 is an illustrative overhead view of a retail store having a retail floor and back storage area and the multi-directional RFID readers installed.

According to the embodiment(s) of the present invention, various views are illustrated in FIGS. 1-4 and like reference numerals are being used consistently throughout to refer to like and corresponding parts of the invention for all of the various views and figures of the drawing. Also, please note that the first digit(s) of the reference number for a given item or part of the invention should correspond to the Fig. number in which the item or part is first identified.

One embodiment of the present invention comprising a pair of multi-directional RFID readers where each reader is placed on opposing sides of a hallway extending between a retail floor and a back storage area where the readers can sense the direction of movement of a product having a RFID tag associated thereto teaches a novel apparatus and method for controlling inventory and shelf restocking in a retail store.

The details of the invention and various embodiments can be better understood by referring to the figures of the drawing. Referring to FIG. 1, an illustrative overhead view of a retail store 100 having a retail floor area 104 and a back storage area 102 is shown. In the retail floor area 104, there can be a plurality of shelves 110 for displaying products offered for sale. The product shelving 110 can be arranged in rows as shown or in various other configurations depending on the retail store. The retail floor area 104 can also include cashier stations 130 where a point-of-sale transaction occurs after a customer has selected a product from the shelf and transported the product to the cashier station for checkout. The cashier stations 130 can include electronic computerized cash registers which can be communicably linked to a background server. The background server can receive transmissions from the checkout station as each product is purchased thereby allowing the background server and related inventory control application to monitor the products on the shelves for the purpose of restocking and inventory control.

A pathway 106 can be positioned between the storage area 102 and the retail floor area 104 thereby providing access to each of the areas from the other. A Replenishment Associate can utilize this passageway to carry products between the back storage area 102 and the retail floor area 104. The illustration in FIG. 1 reflects the passageway 106 as a hallway extending between the storage area and the retail floor area. However, there are other types of passageways that can be utilized between the back storage area and the retail floor area.

Situated on either side of the passageway 106 can be RFID readers 112 and 114. For clarity sake, the RFID reader 114 can be referred to as the right side RFID reader and the RFID reader 112 can be referred to as the left side RFID reader. The area between the readers can be referred to as a portal. Alternatively, the present invention could be implemented only utilizing one RFID reader on one side of the passageway, however, it may be advantageous to utilize an RFID reader on both sides of the passageway as the passageway may be rather large in width. Utilizing left and right RFID readers can provide better coverage of the passageway such that if a Replenishment Associate is walking more towards one side of the passageway than the other, then having readers on both sides should assure appropriate tracking.

However, having two readers can result in redundant readings. If this occurs, the inventory control application residing on the background server can be designed to track time stamps of each reading such that if the time stamps of two rearward looking readings or two forward looking readings are within a certain time window, the application can treat these readings as being the same. The left side RFID reader 112 can have both a left side rearward directional antenna 116 and a left side forward directional antenna 118. The right side RFID reader 114 can have a right side rear directional antenna 120 and a right side forward directional antenna 122.

The RFID readers can be equipped with functionality for providing a time stamp for each reading. It is this time stamp that can be utilized for determining when a reading is a redundant reading, for example, redundant readings between a left side and right side RFID reader. The time stamp can also be utilized for determining when a product transitions from position 124 along a path 126 to position 128. The opposite can also be determined by the time stamp where a product transitions from position 128 along path 126 to position 124.

For example, if a product at position 124 is detected by the rear directional antenna 116 at a time t and the same RFID tag as associated with product is detected by the forward looking antenna 118 at position 128 a time t+a, then it can be determined that the product is moving from the storage area 102 to the retail floor area 104. Other directional antenna configurations and orientations can be utilized without departing from the scope of this invention. The key is having multiple directional antennas and having a time stamp for each antenna detection to determine direction of movement.

The passageway 106 can also be partitioned off by doors 108 such that the RFID readers do not pick up on spurious communications from RFID tags in the retail floor area 104. A similar door or portal can be installed on the storage area side of the passageway. Using RFID tags associated or attached to a product or a product container can allow the present invention to accurately track a movement of product back and forth between the storage area and the retail floor area thereby allowing the inventory control application to properly manage inventory and reshelving or restocking of products.

Figure 2:
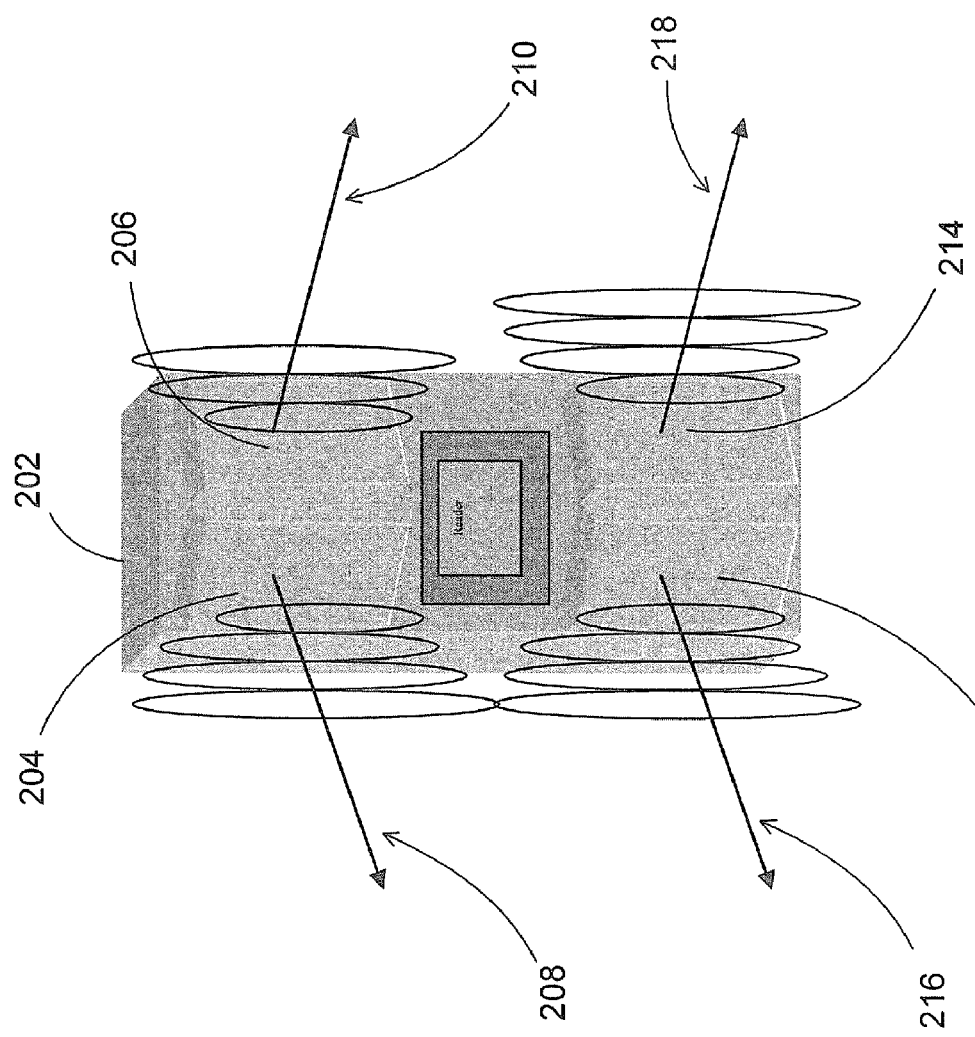
FIG. 2 is an illustration of a multi-directional RFID reader.

Referring to FIG. 2, an illustration of a multi-directional RFID reader 200 is shown. The RFID reader is shown housed in an upright stand 202. The RFID reader can have in addition to directional antennas an upper tier or top set of directional antennas—a lower tier or bottom set of directional antennas. This antenna arrangement having an upper and lower antenna array tier provides greater flexibility for accurate readings such that as a product is being transported by the reader the elevation of the product as it passes through the portal does not become problematic because of the two tier antenna arrays. For example, the RFID reader 200 as illustrated shows a top rear directional antenna 204 and a top forward directional antenna 206. Also illustrated is a top rear signal and a top forward signal, items 208 and 210 respectively. The multi-directional RFID reader can also include a bottom rear directional antenna 212 and a bottom forward directional antenna 214 also including a bottom rear signal and forward signal, 216 and 218 respectively. This RFID reader configuration can adequately track the movement of a product having a RFID tag as it moves back and forth between the storage area and the retail floor area.

Figure 3:
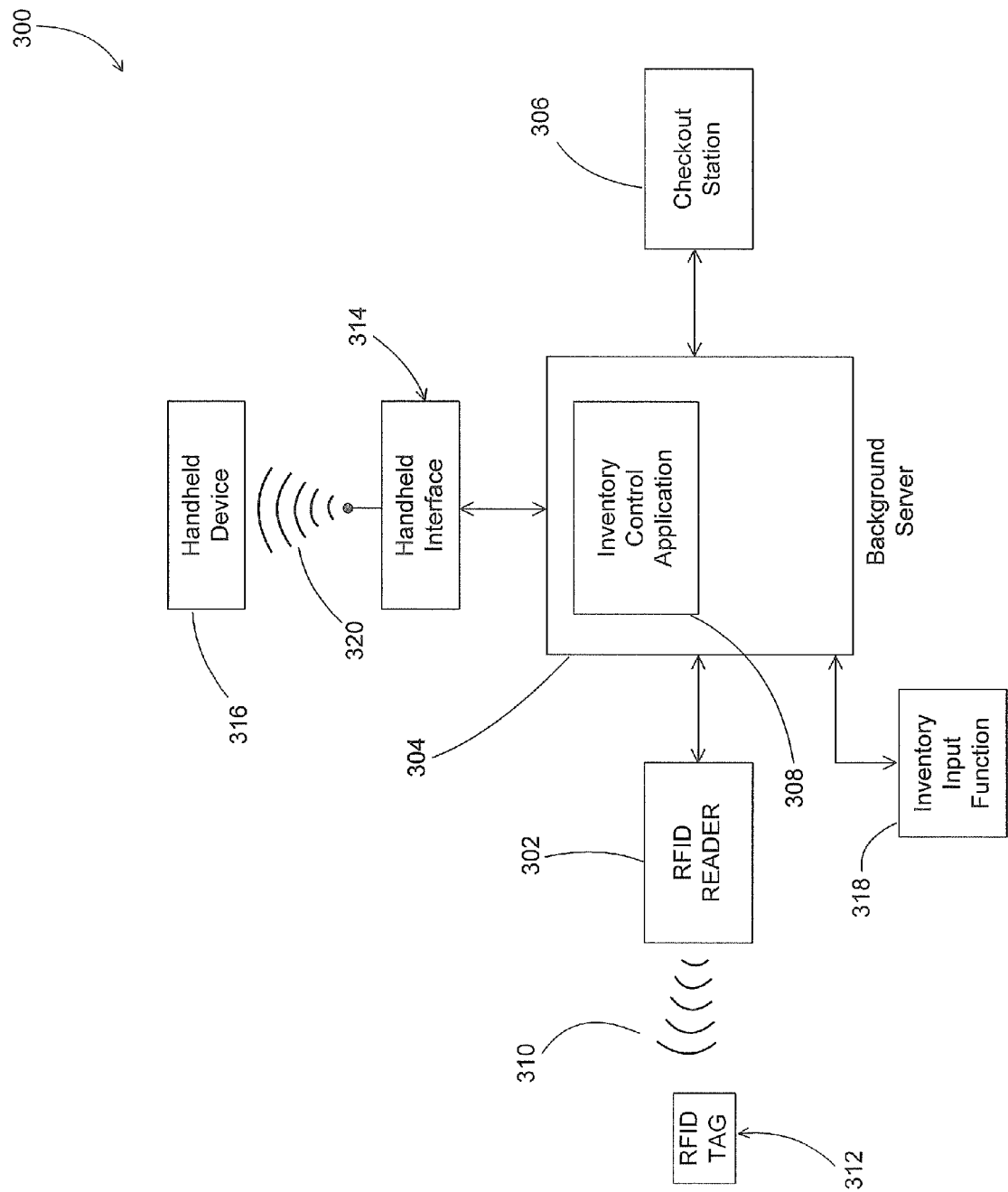
FIG. 3 is an illustrative system block diagram for an inventory control system.

Referring to FIG. 3, an illustrative system block diagram for an RFID reader based inventory control system 300 is shown. The inventory control system 300 includes an RFID reader 302, a background server 304, a checkout station 306 and an inventory input function 318. An RFID tag 312 can communicate by way of an RFID signal interface 310 its pertinent encoded information to an RFID reader 302. The RFID reader 302 can transmit to the background server 304 the reading data. The inventory control application 308 can continuously monitor the RFID transmissions to determine if product movement is detected. The checkout station 306 can also be communicably linked to the background server to provide point-of-sale data indicating the number of products having been sold. The checkout station 306 is shown communicably linked to the background server for communicating such information. Further, the background server can interface with a hand held interface 314 where the hand held interface 314 can communicate to hand held devices 316 by way of a hand held signal 320 to Replenishment Associates if a restocking needs to occur. The system can also provide an inventory input function 318 which allows the system to track new products being received into inventory.

Figure 4:
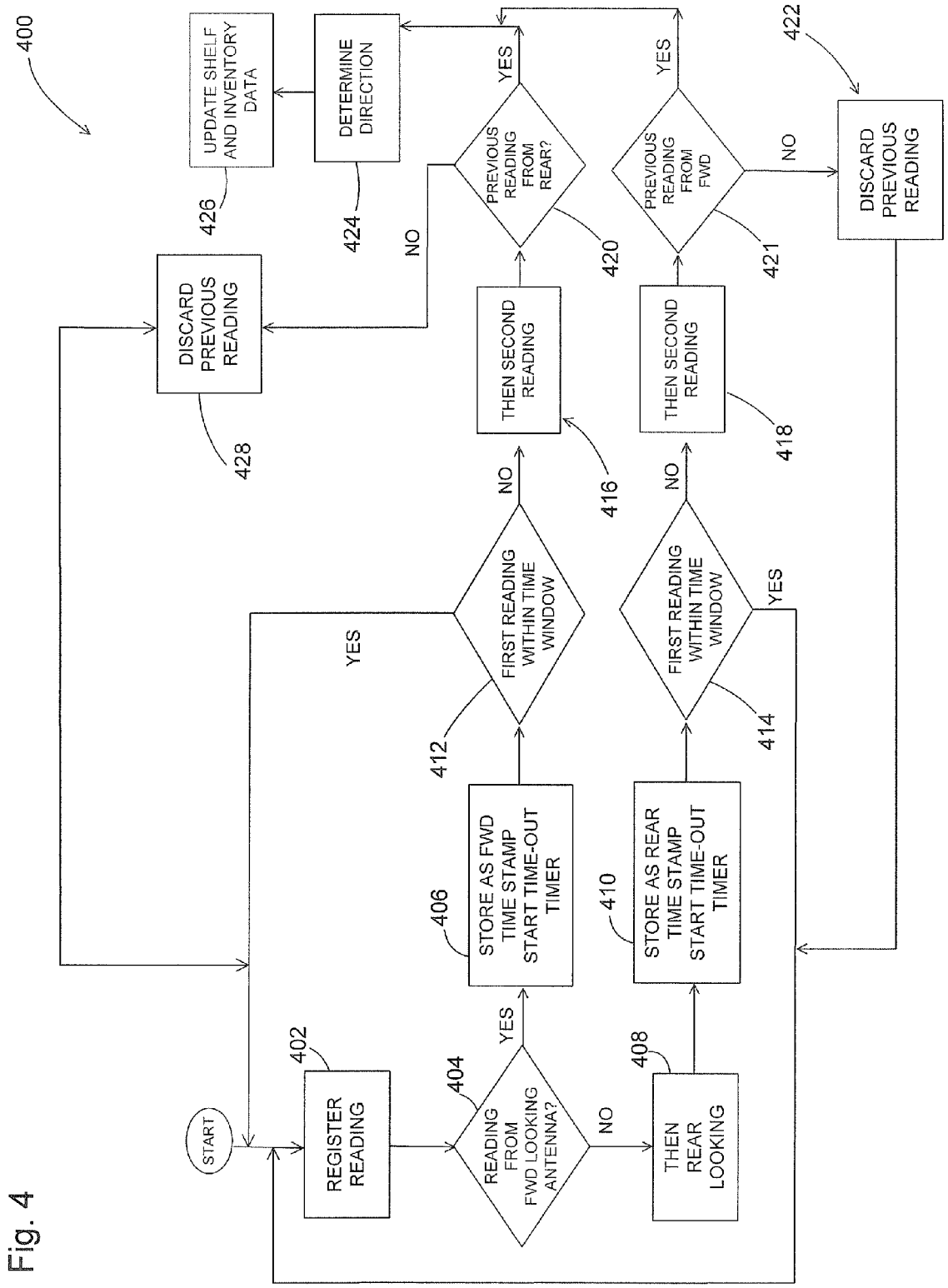
FIG. 4 is an illustrative flow diagram of logic for inventory control.

Referring to FIG. 4, an illustrative flow diagram of logic for an inventory control system is shown. The logic begins with registering a reading 402 (detecting the presence of an RFID tag) at which time the reading is given a time stamp by the RFID reader. The logic can determine if the reading is from a forward looking or a rear looking antenna as reflected by decision block 404 because each antenna can be capable of transmitting its own unique antenna identifier. If the reading originates from a forward looking antenna the data can be stored as a forward looking data element and a time stamp can be associated thereto as reflected by functional step 406. A timeout function can also be incorporated into the logic such that after a certain time window a registered reading can be discarded. The logic can also determine whether the reading registered is a first reading within a given time window as reflected by decision block 412. If it is a first reading then the logic simply continues to continue to register readings. If the reading is not, the first reading then it can be determined to be the second reading as represented by functional block 416. It can be determined if the reading is from the rear as reflected by decision block 420. If the previous reading was not from the rear then the previous reading can be discarded as erroneous as reflected by functional block 428. If the previous reading is determined to be from the rear then the direction of movement can be determined as reflected by functional block 424. The logic of the inventory control application can update the shelf and inventory data as reflected by functional block 426.

If a reading is determined that it did not originate from a forward looking antenna then it is determined that it originated from a rear looking antenna as represented by functional block 408. The information is stored as rear and is time stamped. As discussed above, a time out function can be utilized. It can be determined if this reading is the first reading within a certain time window as reflected by decision block 414. If it is the first reading within a time window then the system can continue to register future readings. However, if it is determined that this is not the first reading within a certain time window then the reading can be determined to be a second reading within a given time window as reflected by functional block 418. It can then be determined as represented by decision block 421 whether the previous reading was from the forward looking antenna. If the previous reading is not from a forward looking antenna then the previous reading can be discarded as reflected by functional block 422. However, if the previous reading is from the forward looking antenna then the system can determine the direction of movement or product and further can update the shelf and inventory data as reflected by functional blocks 424 and 426. Various other logic flows can be utilized without departing from the scope of the invention when using directional RFID readers.

The various RFID tracking inventory control system examples shown above illustrate a novel method and apparatus for controlling inventory and shelf restocking utilizing multi-directional RFID readers. A user of the present invention may choose any of the above inventory control system embodiments, or an equivalent thereof, depending upon the desired application. In this regard, it is recognized that various forms of the subject RFID tracking inventory control system could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. An inventory tracking system comprising:
a multi-directional RFID reader positioned along a passageway connecting a product storage area and a retail floor area, wherein the RFID reader includes a plurality of multiple directed sensors, wherein each of the plurality of multiple directed sensors is directed to detect along the passageway presence of an RFID tag associated with a product at multiple discrete positions as the product and the associated RFID tag travel along the passageway, and wherein said RFID reader has a time stamp function operable to assign a time stamp to each discrete detection of the multiple discrete positions detected;
a background server communicably connected to the RFID reader, wherein the RFID reader includes a transmit function operable to transmit to the background server RFID detections, sensor identifications and associated time stamps; and
an executable inventory control application operably residing on the background server, wherein when executed, the inventory control application determines a direction of travel of the product and the associated RFID tag based on RFID transmissions.

2. The inventory tracking system as recited in claim 1, wherein the plurality of multiple directed sensors include two directed sensors obtusely directed one with respect to the other, wherein one sensor is directed rearwardly and the other sensor is directed forwardly along the passageway.

3. The inventory tracking system as recited in claim 2, wherein the two directed sensors and two second tier directed sensors are directed RFID antennas.

4. The inventory tracking system as recited in claim 3, wherein the plurality of multiple directed sensors include two second tier directed sensors obtusely directed one with respect to the other, and wherein one of the second tier sensors is directed rearwardly and the other sensor is directed forwardly along the passageway.

5. The inventory tracking system as recited in claim 4, wherein the background server is communicably linked to a hand held inventory control device.

6. An inventory tracking system comprising:
a first multi-directional RFID reader and a second multi-directional RFID reader each on opposing sides of and positioned along a passageway connecting a product storage area and a retail floor area, wherein each of the RFID readers includes a plurality of multiple directed sensors, wherein each of the plurality of multiple directed sensors is directed to detect along the passageway presence of an RFID tag associated with a product at multiple discrete positions as the product and the associated RFID tag travel along the passageway, and wherein said RFID readers each has a time stamp function operable to assign a time stamp to each discrete detection of the multiple discrete positions detected;
a background server communicably connected to each of the RFID readers, wherein each of the RFID readers includes a transmit function operable to transmit to the background server RFID detections, sensor identifications and associated time stamps; and
an executable inventory control application operably residing on the background server, wherein when executed, the inventory control application determines a direction of travel of the product and the associated RFID tag based on RFID transmissions.

7. The inventory tracking system as recited in claim 6, wherein the plurality of multiple directed sensors include two first directed sensors obtusely directed one with respect to the other and two second directed sensors obtusely directed one with respect to the other.

8. The inventory tracking system as recited in claim 7, wherein the plurality of multiple directed sensors include two second tier first directed sensors obtusely directed one with respect to the other and two second tier second directed sensors obtusely directed one with respect to the other.

9. The inventory tracking system as recited in claim 8, wherein the plurality of multiple directed sensors are directed RFID antennas.

10. The inventory tracking systems as recited in claim 9, wherein the background server is communicably linked to a hand held inventory control device.

11. An inventory tracking system comprising:
a first multi-directional encoded tag reader positioned along a first lengthwise side of a passageway connecting a product storage area and a retail floor area, wherein the encoded tag reader includes a first plurality of multiply directed sensors, wherein each of the first plurality of multiply directed sensors is directed to detect along the passageway presence of an encoded tag associated with a product at multiple discrete positions as the product and the associated encoded tag travel along the passageway, and wherein said encoded tag reader has a first time stamp function operable to assign a first time stamp to each discrete detection of the multiple discrete positions detected by the first encoded tag reader;
a second multi-directional encoded tag reader positioned along a second lengthwise side of the passageway opposite the first lengthwise side, wherein the second encoded tag reader includes a second plurality of multiply directed sensors, wherein each of the second plurality of multiply directed sensors is directed to detect along the passageway presence of an encoded tag associated with a product at multiple discrete positions as the product and the associated encoded tag travel along the passageway, and wherein said second encoded tag reader has a second time stamp function operable to assign a second time stamp to each discrete detection of the multiple discrete positions detected by the second encoded tag reader;
a background server communicably connected to the first and second encoded tag readers, wherein the each of the first and second encoded tag readers includes respective first and second transmit functions operable to transmit to the background server detections, sensor identifications and associated time stamps; and
an executable inventory control application operably residing on the background server, wherein when executed, the inventory control application determines a direction of travel of the product and the associated encoded tag based on the first and second encoded tag reader transmissions.

12. The inventory tracking system as recited in claim 11, wherein the plurality of multiple directed sensors include two first directed sensors obtusely directed one with respect to the other and two second directed sensors obtusely directed one with respect to the other.

13. The inventory tracking system as recited in claim 12, wherein the plurality of multiple directed sensors further include a second tier including two first directed sensors obtusely directed one with respect to the other and two second directed sensors obtusely directed one with respect to the other.

14. The inventory tracking system as recited in claim 13, wherein the plurality of multiple directed sensors are directed RFID antennas.

15. The inventory tracking system as recited in claim 14, wherein the background server is communicably linked to a hand held inventory control device.

16. A method for tracking inventory comprising:
positioning a multi-directional RFID reader along a passageway connecting a product storage area and a retail floor area, wherein the RFID reader includes a plurality of multiple directed sensors, wherein each of the plurality of multiple directed sensors is directed to detect along the passageway presence of an RFID tag associated with a product at multiple discrete positions as the product and the associated RFID tag travel along the passageway and, wherein said RFID reader has a time stamp function operable to assign a time stamp to each discrete detection of the multiple discrete positions detected;
providing a background sewer communicably connected to the RFID reader, wherein the RFID reader includes a transmit function operable to transmit to the background server RFID detections, sensor identifications and associated time stamps;
detecting the RFID tag at multiple discrete positions along the passageway and time stamping each of the multiple discrete positions detected;
transmitting to the background server RFID detections, sensor identifications and associated time stamps; and
executing an executable inventory control application operably residing on the background server, wherein when executed, the inventory control application determines a direction of travel of the product and the associated RFID tag based on RFID transmissions.

17. The method as recited in claim 16, wherein the plurality of multiple directed sensors include two directed sensors obtusely directed one with respect to the other, and wherein one sensor is directed rearwardly and the other sensor is directed forwardly along the passageway.

18. The method as recited in claim 17, wherein the plurality of multiple directed sensors further include a second tier including two directed sensors obtusely directed one with respect to the other, wherein one of the second tier sensors is directed rearwardly and the other sensor is directed forwardly along the passageway.

19. The method as recited in claim 18, wherein the two directed sensors and two second tier directed sensors are directed RFID antennas.

20. The method as recited in claim 19, wherein the background server is communicably linked to a hand held inventory control device.

* * * * *